March 12, 1957

J. H. FULPER

2,784,607

COMBINATION BELT DRIVE INTERRUPTING
MECHANISM WITH BELT GRIPPING MEANS

Filed April 18, 1951

INVENTOR.
John H. Fulper
BY
Eberhard E. Wettley
Atty.

March 12, 1957

J. H. FULPER

2,784,607

COMBINATION BELT DRIVE INTERRUPTING
MECHANISM WITH BELT GRIPPING MEANS

Filed April 18, 1951

INVENTOR.
John H. Fulper
BY
Eberhard E. Wedley
Atty.

March 12, 1957 J. H. FULPER 2,784,607
COMBINATION BELT DRIVE INTERRUPTING
MECHANISM WITH BELT GRIPPING MEANS
Filed April 18, 1951 6 Sheets-Sheet 5

INVENTOR.
John H. Fulper
BY
Eberhard E. Weltty
Atty.

Fig. 9.

INVENTOR.
John H. Fulper
BY
Eberhard E. Wetley
Atty.

:::

United States Patent Office 2,784,607
Patented Mar. 12, 1957

2,784,607

COMBINATION BELT DRIVE INTERRUPTING MECHANISM WITH BELT GRIPPING MEANS

John H. Fulper, Kewanee, Ill., assignor to Kewanee Machinery & Conveyor Company, Kewanee, Ill., a corporation of Illinois Application April 18, 1951, Serial No. 221,678

8 Claims. (Cl. 74—242.14)

This invention relates to power drive means that may be directly associated with material conveying elevators.

The invention is more specifically directed to a combination belt drive interrupting mechanism having a belt gripping means that is incorporated and arranged for co-action with a self-contained power unit for portable farm elevators or conveyors, and which unit is carried directly upon the conveyor structure to supply motive power for driving the elevator whenever necessary. The drive unit, its supporting structure and control mechanism are all arranged in a location that offers no interference with the manipulation of the conveyor either while the conveyor is in operation or when the conveyor is arranged and rigged for transportation from place to place.

Various driving units with drive transmissions and power drive control mechanisms have been used in the past for hooking up with a portable farm elevator to drive the latter. Such units are not considered standardized and usually require special connections, fittings, gear means and other similar mechanisms which together can be connected to drive a conveyor or elevator. A further handicap has presented itself in that the conveyor can only be driven from one side, but if the same driving unit is employed from the opposite side, as is frequently required where clearances must be considered, reverse drive mechanisms must be interposed in order to obtain the same lineal direction of operation of the conveyor during operation.

In a copending application filed of even date herewith directed to a Multiple Drive Unit for Conveyors, Serial No. 221,677, filed April 18, 1951, now Patent No. 2,710,107, applicant therein eliminates the use of the various drive units and has standardized the point of drive on the conveyor as well as the speeds that can be transmitted from the unit of the copending application as therein shown and described.

One of the objects of this invention is to provide a lateral supporting frame on the conveyor which is adapted for mounting the engine and its conveyor driving mechanisms laterally outwardly with respect to the general plane of the conveyor so that any type or size of engine within normal uses for this purpose may be mounted upon this frame to operate and intermittently drive the elevator without interfering with the portability or normal designed manipulation of the entire structure.

It is another object of the present invention to provide a laterally supported frame that movably mounts the engine or motor with respect to the main conveyor drive pulley or shaft so that the belt which connects the power unit and the drive member of the conveyor may be tensioned to suit conditions of operation and wherein this arrangement is particularly well adapted for belt drive interrupting mechanism of the character hereinafter to be described.

A further object of the present invention is to provide a quickly shiftable means that may be manually operated to move the engine and its belt drive wheel toward or away from a driven shaft and its belt driven member to thus entirely interrupt the drive by freeing the belt from the driving wheel of the engine or motor.

It is a still further object of the present invention to provide cooperative belt gripping mechanism which co-acts simultaneously with the movement of the engine to grip both runs of the belt as the latter is freed from the engine driving pulley as the drive to the conveyor is interrupted through the shiftable mounting supporting the engine.

It is a further object of this invention to provide a mounting that normally remains substantially parallel with the ground as carried by the reach frame of the conveyor, which mounting also disposes the engine and its operative mechanisms in a convenient position for servicing, repairing or replacement.

Other objects and advantages relating to the drive means for material conveying elevators of the present invention shall hereinafter appear in the following detailed description relating to the accompanying drawings forming a part of this specification.

Figure 1:
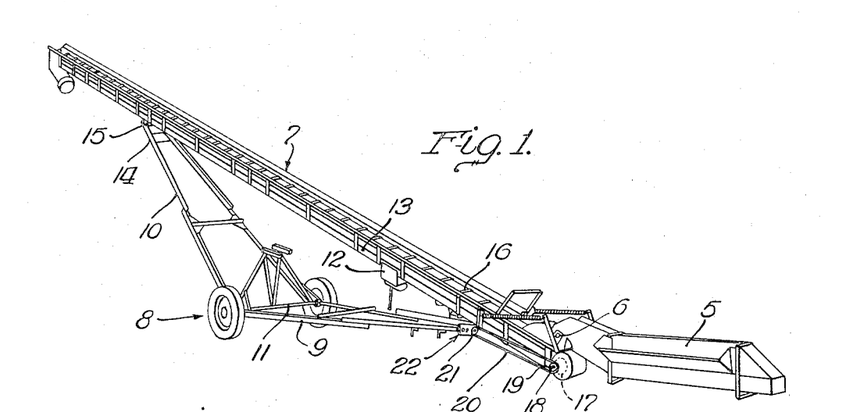
Fig. 1 is a perspective view of a farm elevator of the portable kind which incorporates the drive means of the present invention for operating the conveyor.

The typical farm elevator generally shown in Fig. 1 comprises a feed hoper 5 pivotally connected by suitable bearing means 6 to the main conveyor 7 which is supported on a wheeled frame 8 comprising a push frame or reach frame 9 and a derrick 10 that is pivotally supported upon the wheel axle 11 for angular adjustment by means of a cable connected self locking winch 12 that is carried by the trough 13 of the conveyor 7. The outer swingable end 14 of the derrick has a suitable roller arrangement 15 which rides against the under side of the trough 13 of the conveyor 7, and the winch cable is connected with the means 15 and winds upon the winch 12 so that the derrick 10 may be angularly adjusted with respect to the reach frame 9 to obtain any desirable angle of elevation of the conveyor 7 within the limits of operation of this farm elevator. A suitably constructed conveyor chain 16 is carried by suitable sprockets in the conveyor 7 and passes over suitable sprockets 17 at the lower end of the conveyor 7 and adjacent the trough 13, which sprockets 17 are carried by a shaft 18 having a drive sprocket 19. The latter is connected by a chain 20 with a sprocket 21 that forms the main driving wheel of the multiple drive unit 22 shown and described in my copending application hereinbefore mentioned.

Figure 2:
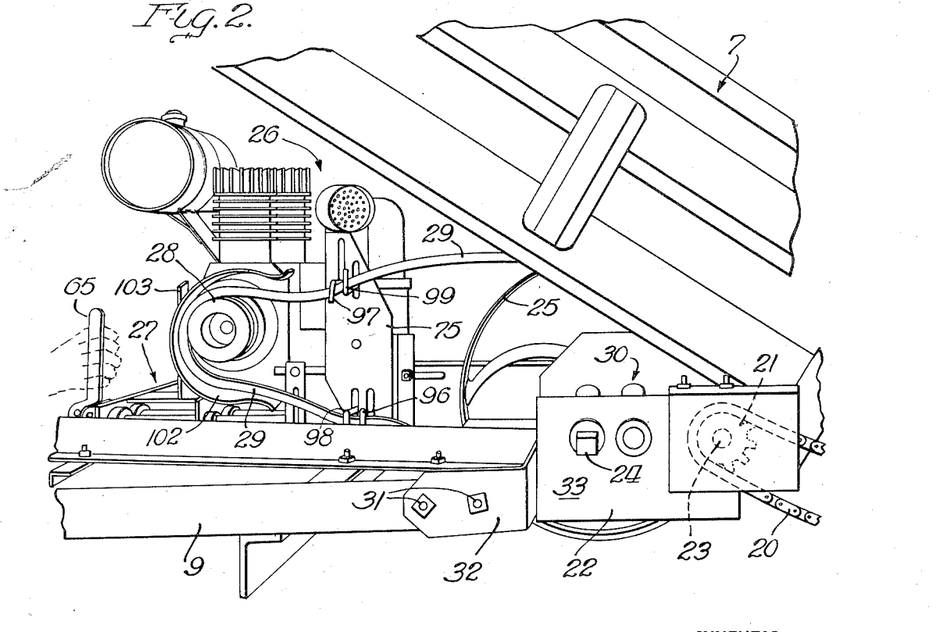
Fig. 2 is a fragmentary perspective view on a larger scale illustrating the present invention as it is applied to the conveyor for driving the latter.

As seen in Fig. 2, sprocket 21 is carried by a shaft 23 which forms a part of the transmission unit 22 comprising the multiple drive unit described in my copending application, and a shaft 24 carries the drive pulley 25 forming the main driving element of this transmission 22.

Figure 9:
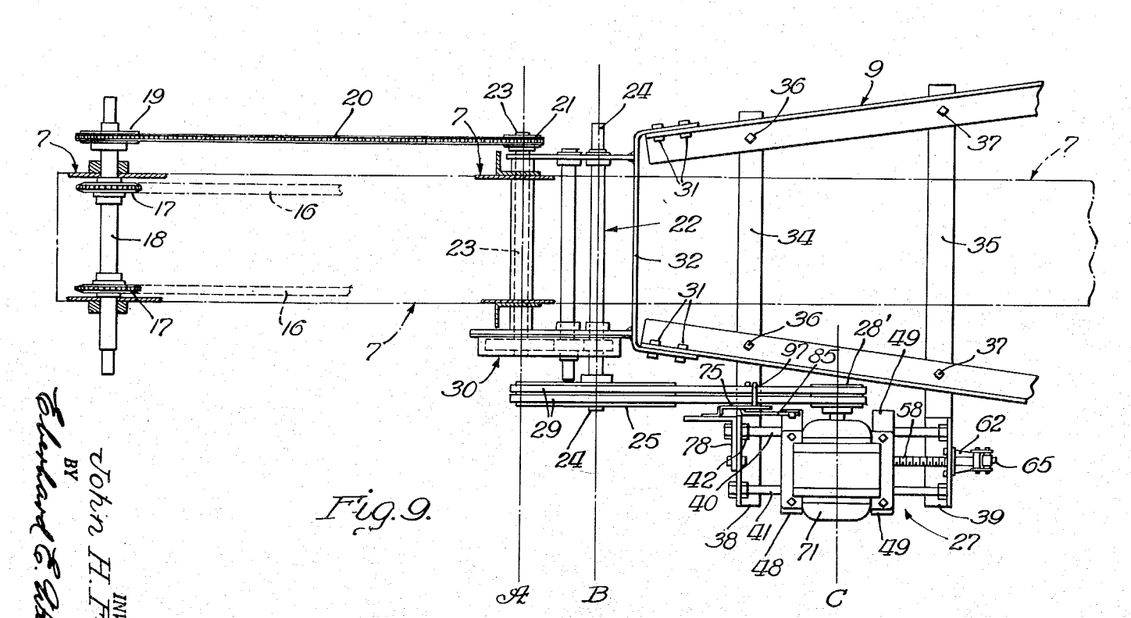
Fig. 9 is a diagrammatic plan view with parts shown in section and generally illustrating the cooperative arrangement of the driving units of the farm elevator incorporating the power drive means of the present invention.

As seen in Fig. 2, a gasoline engine 26 is mounted upon the frame structure 27 to suitably position the engine drive pulley 28 in a given relation with respect to the pulley 25 and to transmit power through one or more belts 29 from the engine pulley 28 to the drive pulley 25 of the multiple drive unit 22. It is to be explained at this point that the main drive shaft 23 of the power transmission mechanism 22 is located coaxially with respect to the pivotal structure connecting the conveyor 7 with the reach frame 9 as best shown in Fig. 9, so that the position of the shaft 23 will always occupy the same relationship with respect to the conveyor 7 and reach frame 9 regardless of the relative inclinations between the two. Also, the drive pulley 25 operates through the mechanism 30 generally illustrated and comprising the operative working parts of the transmission 22 by which arrangement the axial center of the pulley 25 is also maintained in a given relationship with respect to the main drive shaft 23. With this organization of elements, it is now possible to provide a given point of drive such as the pulley 25 to which may be connected suitable power transmission means for driving the conveyor, and this relationship will not change as has been more fully disclosed and described in my copending application.

Figure 3:
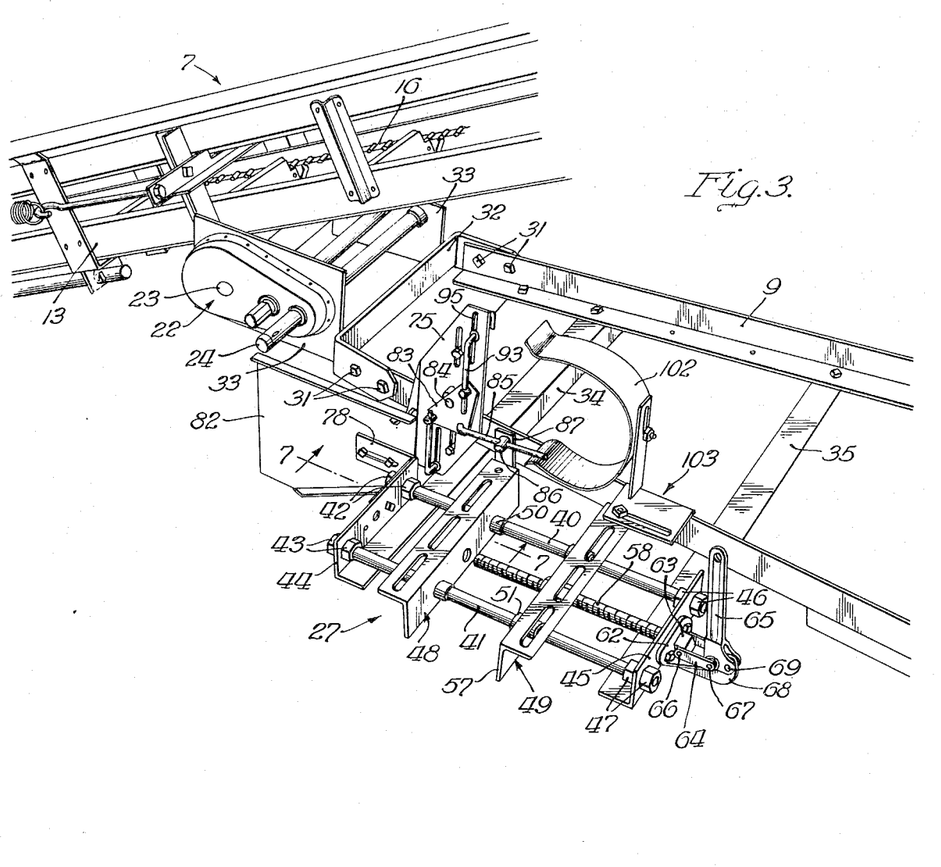
Fig. 3 is a fragmentary perspective view as seen from the opposite side of the conveyor with respect to Fig. 2 and showing the general arrangement of the entire mounting means as connected with the reach frame of the conveyor and illustrating the associated drive interrupting mechanisms coacting therewith, this view showing the belt gripping parts as they would appear when adjusted to operate in one given relationship.
Figure 4:
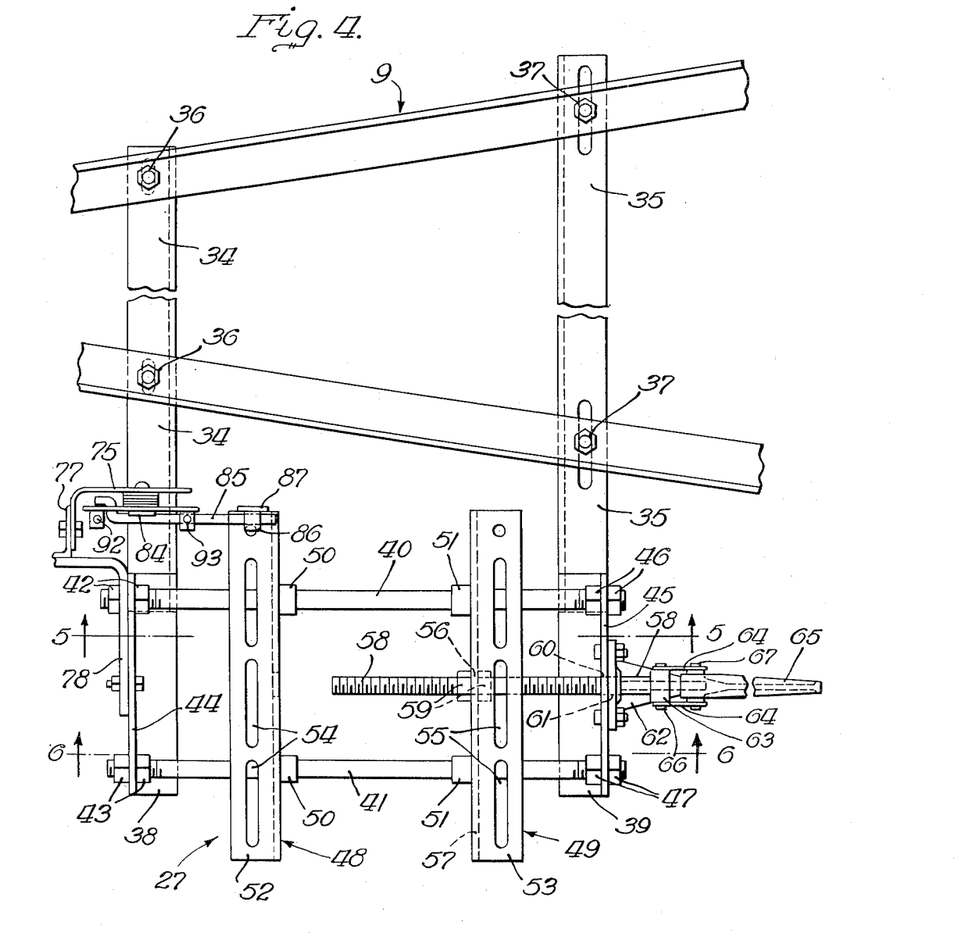
Fig. 4 is a plan view of the lateral frame and its relation to the reach frame of the conveyor to further show certain details of construction of this mounting assembly.
Figure 5:
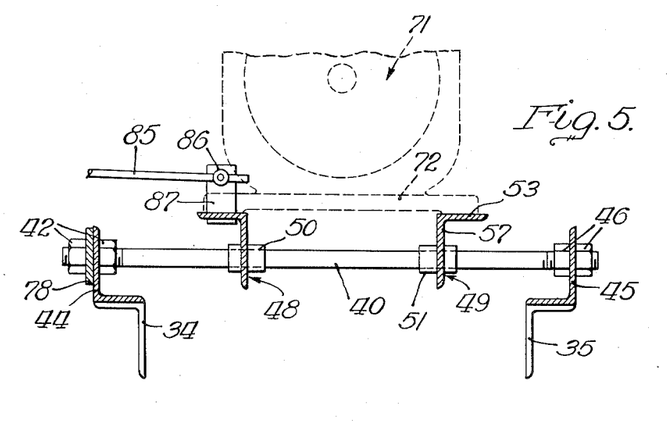
Fig. 5 is a longitudinal cross sectional view taken substantially along the line 5—5 in Fig. 4 to further illustrate the relationship of some of the coacting parts of the lateral mounting for the conveyor power unit.

Referring now to Fig. 3, a reach frame 9 is securely fastened through the bolts 31 to the bracket 32 and forms an integral portion of the side plates 33 of the transmission 22. Transverse angles 34 and 35 are secured across the reach frame 9 and extend laterally outwardly therefrom as best shown in Fig. 4. Fig 4 illustrates suitable adjustable fastening structures 36 and 37 which permit lateral adjustment of the angles 34 and 35 and also permit angular adjustment of the reach frame parts whenever this becomes desirable. As best shown in Figs. 3 and 4, the carrier frame indicated generally at 27 is mounted upon the projecting end of the angles 34 and 35 and secured thereto in any known fashion to dispose the carrier frame laterally outwardly with respect to the reach frame 9 which also disposes this carrier frame in a position laterally outwardly with respect to the trough 7 that is superimposed above the reach frame 9 as shown in Fig. 3.

Carrier frame 27 comprises terminal angles 38 and 39 that are positioned upon the angles 34 and 35 and parallel rods 40 and 41 are adjustably connected by means of nuts 42 and 43 to the upstanding leg 44 of angle 38 at one end, and these rods are secured to the upstanding leg 45 of the angle 39 by means of the nuts 46 and 47. This establishes a rod guideway disposed in a fore and aft direction with respect to the farm conveyor and also positioned laterally outwardly when considered in relation to the reach frame 9 and trough 7. A pair of inverted angles 48 and 49 are supported for sliding movement along the rods 40 and 41 by means of suitable sleeves 50 and 51 respectively. These angles have their horizontal legs 52 and 53 turned oppositely outwardly and supplied with suitable openings such as 54 and 55 to provide fastening means to receive securing elements for tying and supporting a power plant to the angles 48 and 49. The right hand angle as best seen in Figs. 3 and 4 is provided with a central opening 56 in the vertical flange 57 to receive a threaded screw 58 freely therethrough with the nuts 59 securing the screw 58 to the vertical flange 57 of the angle iron 49.

Figure 6:
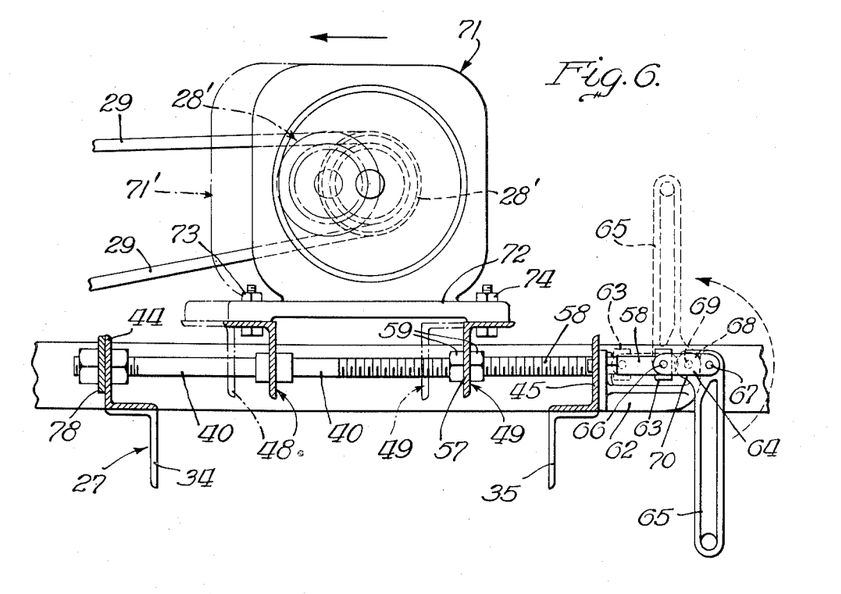
Fig. 6 is another longitudinal cross sectional view taken substantially along the line 6—6 of Fig. 4 to further illustrate the cooperative relationship of certain of the parts of this invention.

As best shown in Figs. 4 and 6, the screw 58 passes freely through a suitable opening 60 in the vertical leg 45 of the angle 39 and also through an aligned opening 61 in a bracket 62 that is secured to the leg 45 of the angle 39. Screw 58 terminates with a square head 63 which is connected by a pair or links 64 to an operating lever 65, links 64 being pivotally connected with the head 63 by means of a pin 66 and to the lever by means of a pin 67. Referring to Fig. 6, it will be noted that the bracket 62 terminates outwardly with an upstanding end 68 carrying a pivot pin 69 to pivotally support lever 65 by means of the lateral ear 70 on the lever to thus impart swinging movement to pin 67 about the pin 69 as the lever 65 is moved from the broken line position in Fig. 6 to the full line position shown therein or vice versa. This operation of the lever 65 will impart lineal movement to the screw 58 through the links 64, which movement is transmitted to the inverted angle 49 to move the latter longitudinally along the rods 40 and 41. It should be noted that when lever 65 is in the lowered position shown in Fig. 6, that the three pins 66, 67 and 69 are lodged in a straight line position with respect to the axial center line of the screw 58, and in this position the angle 49 occupies the position furthest to the right as seen in full lines in Fig. 6. The weight of the handle 65 will maintain the full line relationship of the parts as just described. When handle 65 is swung upwardly into the broken line position, screw 58 will be moved forwardly and the three pins 66, 67 and 69 will then occupy another straight line position coincident with the axis of shaft 58 to hold angle 49 in the broken line position indicated in Fig. 6. Thus the screw 58 provides an adjustable but sturdy push element that is controlled by the movements of handle 65 to bodily displace the movable framework that carries the power unit such as 26.

The power plant indicated in Fig. 2 comprises a suitable gasoline engine 26 which can be mounted upon the angles 48 and 49 which are independently movable relatively to each other upon the rods 40 and 41 to accommodate bolt positions in the longitudinal direction of the carrier frame 27. The generously supplied openings 54 and 55 in the angles 48 and 49 permit considerable leeway transversely of the carrier frame 27 to receive bolt fastenings to secure a power plant such as 26 to the carrier frame. While Fig. 2 shows a gasoline engine 26 as a power plant, Fig. 6 illustrates an electric motor 71 as the means for furnishing power to drive the conveyor. Motor 71 may be of any suitable conventional type terminating in a usual base 72 that can be bolted as at 73 and 74 to the horizontal flanges of the angles 48 and 49 as illustrated. With this arrangement, the motor 71 and its base 72 form the bridging means to connect the angles 48 and 49, and at the same time angles 48 and 49 provide a supporting means for the power plant to bodily carry the same for longitudinal movement along the rods 40 and 41 of the carrier frame 27. Although not shown in Fig. 2, the engine 26 is also bolted by means of its base to the angles 48 and 49 bridging the latter as it is supported on such angles.

With the pivotally offset lever arrangement shown in Fig. 6, as connected with the angles 48 and 49 by means of the screw 58, shiftable means is thereby interposed between the carrier frame 27 and the power plant 26 or 71, to move one or the other of said power plants into either of two limiting positions along a predetermined path. By securing a power plant of any selected design to the angles 48 and 49, and by then making the necessary adjustments of the nuts 59 to position the leg 57 of the angle 49 in a given relation with respect to the length of the screw 58, this mechanism will then provide means for tightening the belt 29 between the pulley 25 and a pulley such as 28 of the gasoline engine 26 or 28' on the motor 71. This adjustment is obviously made with the lever 65 shown in the full line position in Fig. 6, at which time the power plant, as adjusted by the shiftable means, is located in its extreme right position to efficiently drive the pulley 25 through a properly adjusted transmission means such as the belt 29. And the drive from pulley 25 through the transmission drive means 22 will then be transmitted to the shaft 23, sprocket 21 and chain 20 to the main drive shaft 18 of the conveyor as clearly illustrated in Fig. 9.

In moving the lever 65 in Fig. 6 to its upright position indicated in broken lines, the power plant will be moved to the left such as the motor 71 in Fig. 6 to occupy a new position as indicated at 71'. With this same operation, an engine such as 26 can also be moved toward the pulley 25 so that the distances between the axial center of the pulley 28 and pulley 25 is adequately decreased to free the belt 29 from its operative engagement with the pulley 28. When this situation results, the engine 26 will run freely and the transmission of power through the belt 29 will be interrupted so that the conveyor chain 16 will stop.

Figure 7:
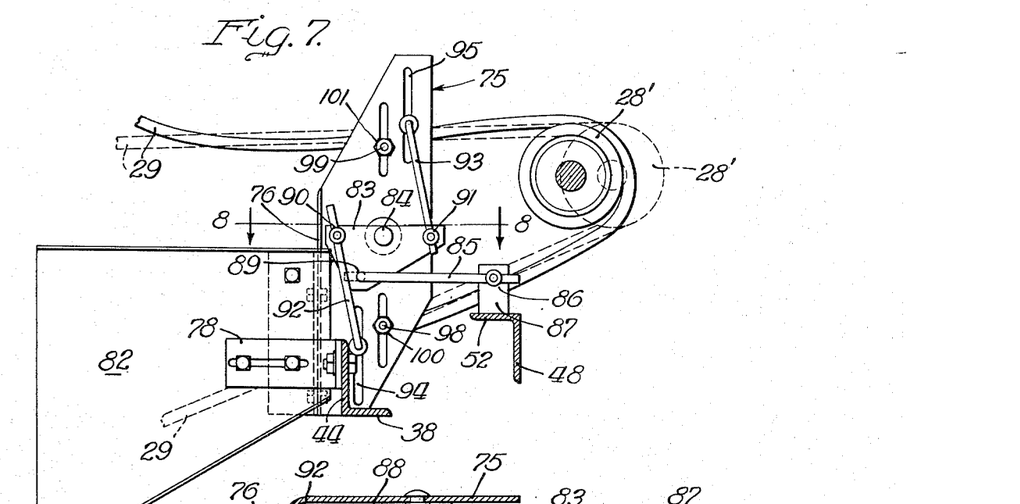
Fig. 7 is a cross sectional view of a fragmentary portion of the lateral mounting unit substantially as seen along the line 7—7 in Fig. 3 to more specifically illustrate the structure and arrangement of parts of the belt gripping mechanism of the present invention, the relationship of the belt gripping parts being here shown as adjusted somewhat differently with respect to their positions in Fig. 3.
Figure 8:
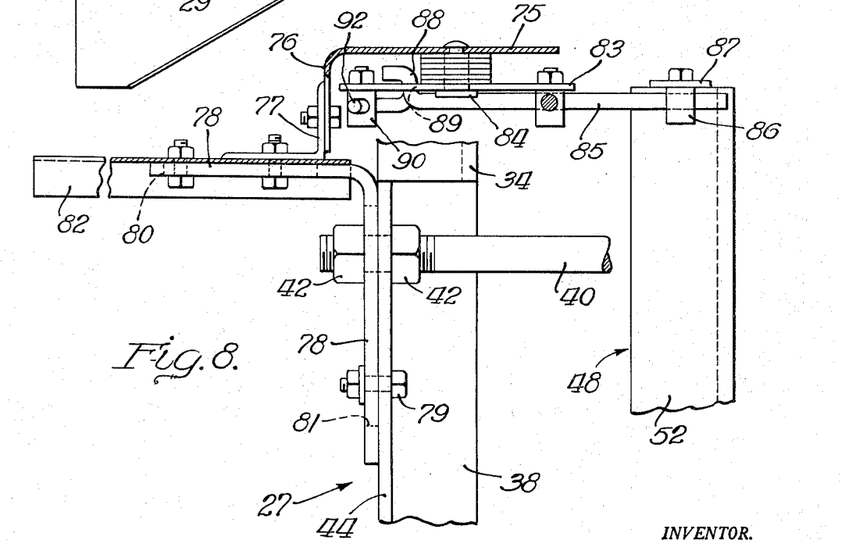
Fig. 8 is a fragmentary plan sectional view on an enlarged scale taken substantially along the line 8—8 in Fig. 7 to illustrate further details relating to the belt gripping fingers shown in Fig. 7.

Directly coordinated with the action of the belt being freed by the movement of a power plant toward the drive pulley 25 is a mechanism such as illustrated in Figs. 3, 7 and 8 which forms a belt gripping means that is capable of grasping both runs of the belt to immediately hold the same in position in the plane of the connected pulleys whenever the carrier frame 27 dislocates the power plant from its operative driving position through the shiftable means of the carrier frame. This belt gripping mechanism operates substantially simultaneously with shifting of the power plant so that the belt which is in motion will not have the opportunity or time to become displaced and will be maintained in its loosened position as shown in Fig. 2 until the power plant is again retracted into the driving position with the pulley 28 tight against the adjacent loop or loops of the belt 29.

The belt tightening mechanism illustrated in Figs. 3, 7 and 8 comprises a vertical plate 75 supported through a suitable integral bracket 76 connected by means of an angle 77 to a bracket 78. One leg of the bracket 78 is positioned parallel with the upstanding flange 44 of the angle 38 and is secured to the angle by means of one of the nuts 42 and also by the bolt fastening means 79 to fixedly position the plate 75 in a given relationship with respect to the carrier frame 27. Each leg of the bracket 78 is slotted as shown at 80 and 81 to permit longitudinal and lateral adjustments of the plate 75 with respect to the frame 27. A belt guard 82 is also conveniently interposed between the angle 77 and the adjacent leg of the bracket 78 as best illustrated in Figs. 3, 7 and 8.

An operating plate 83 is rockably mounted upon a pivotal stud 84 carried substantially centrally of the plate 75. A connecting rod 85 is adjustably and pivotally carried through a swivel pin 86 which is suitably secured to an upright 87 that is welded or otherwise secured to flange 52 of the angle 48. The free end of rod 85 is suitably deformed as at 88 to pass through an opening 89 in plate 83. Oppositely arranged swivel heads 90 and 91 are secured to the plate 83 and adjustably connected rods or rod members 92 and 93 are connected with the swivel heads 90 and 91 for movement directly therewith whenever the plate 83 is rocked. Plate 75 has laterally spaced vertical slots 94 and 95 through which the bent ends of the rods 92 and 93 extend for slidable movement in the slots 94 and 95 in plate 75, and rods 92 and 93 terminate with hook finger ends as shown at 96 and 97 in Fig. 2. These finger ends extend laterally outwardly from the plate 75 in offset or staggered relation lengthwise of the belt runs and for a sufficient distance to engage transversely under and over the bottom and top runs of the belt 29 and terminate with vertically disposed ends positioned beyond the belt 29.

Coacting directly with the rods 92 and 93 and the fingers 96 and 97 thereon are a pair of fixed hook fingers shown at 98 and 99 in Fig. 2 that are adjustably bolted at 100 and 101 to the plate 75 as best shown in Fig. 7. Fingers 98 and 99 also project outwardly from plate 75 a sufficient distance to hook tranversely over the lower and upper runs of the belt 29 and these fingers are normally adjusted at a predetermined distance from the belt 29 when the latter is in tightened and operating position, which would be indicated in the broken lines shown in Fig. 7.

With the belt tightening mechanism described, it is, therefore, possible to grip both runs of the belt simultaneously with the movement of the carrier frame since the movement from the latter is imparted to plate 83 by means of the push rod 85 which will rock plate 83 as seen in Fig. 7 in a clockwise direction to cause the rods 92 and 93 to slidably move upwardly and downwardly respectively in relation to plate 75 and to carry the finger ends 96 and 97 of these rods against the lower and upper runs of the belt 29. As this action occurs, the fixed fingers 98 and 99 hold the belt as the latter becomes engaged by the movable fingers 96 and 97 so that the belt is immediately grasped to hold the same in the vertical plane of operation even though such belt has been loosened from the drive pulley 28 or 28' as shown in Figs. 2, 6 and 7.

Reversing the movement of the carrier 27 will automatically bring the drive pulley into engagement with the loose end of the belt and simultaneously with this action the fingers of the gripping mechanism will release both runs of the belt to accommodate the restoration to the drive position of the drive elements described. Attention is also directed to the length of the fingers as shown in Fig. 2 and that each pair of oppositely directed fingers 96 and 98 and 97 and 99 are of sufficient length to maintain control of the belt runs through each of the pairs of fingers until such a time that the pulley 28 has taken over fully enough to tighten belt 29 and to restore the drive through the belt to the drive pulley 25.

As best seen in Figs. 2 and 3, a wide belt guard 102 is carried by a bracket 103 upon angle 49 to move with the shiftable means and power plant. This guard 102 aids in holding the end run of the belt at pulley 28 free of the latter and keeps the belt from sagging at pulley 28 to hold the belt normally free from frictional contact with the pulley when the drive has been interrupted as best shown in Fig. 2.

Referring to Fig. 9, it will be noted that the various axes A, B and C respectively, which mark the axial centers of the shafts 23 and 24 and of the drive pulley 28 of the power plant, are all axes that are fixed in position with respect to each other and with respect to the connected mechanisms as shown in Fig. 9. It is through this fixed relationship between the various operating and driving elements as located upon the axes A, B and C that it is possible to mount a power plant in a given relationship upon one of the units of the conveyor, and it is also possible to introduce the shiftable means to decrease the distance between the axes B and C to interrupt the drive from the power plant to pulley 25. Thus, with this arrangement of drive interrupting mechanism complemented by the belt gripping means just described above, it is possible to provide an efficient and easily operable power plant structure that can be carried upon the reach or push frame 9 of the conveyor as an assembled unit thereof and which will function in its capacity at all times when needed while not interfering with any of the manipulations of the farm elevator relating to the portability thereof or to the proper adjustment for raising materials to a given height as required.

The above description has been directed to a specific embodiment and arrangement of the invention as disclosed in the drawings and as relating to a drive means for material conveying elevators. Other similar uses may also be available to the drive means of the present invention, and it is also contemplated that modifications and differences in the combination of parts may be made without departing from the fundamental concept of this invention. Such changes shall, however, be governed by the breadth and scope of the appended claims.

What I claim is:

1. Drive interrupting mechanism for an implement having an implement drive member, comprising a fixed frame, guideways on the fixed frame, a movable frame carried upon said guideways, a power unit on said movable frame, a driving member on said power unit, power transmission means for connecting said members, and shiftable mechanism interposed between said fixed and movable frames comprising a push element slidably carried by said fixed frame and connected with said movable frame, an operating handle pivotally connected with said fixed frame and a toggle unit connected between said handle and said push element to actuate said movable frame between two predetermined positions whereby to engage said power transmission means for transmitting the drive between said members or to slacken said power transmission means to interrupt the drive between said members respectively, said push element comprising a threaded stud with fastening means thereon provided for adjustable connection with said movable frame and to relocate the two predetermined positions of said movable frame to control said transmission means.

2. Drive interrupting mechanism comprising a power means having a drive wheel, a flexible belt to connect said drive wheel with a driven wheel, a shiftable carriage to movably support the power means and drive wheel, actuating means to move said carriage to release said belt from said drive wheel, and belt gripping means comprising a fixed support, rod members mounted upon said support and having fingers positioned transversely with respect to the belt runs, other rod members movably carried upon said support and having fingers for coacting with said fixed fingers respectively, and operative means constructed and arranged to actuate said movable fingers toward and away from said fixed fingers toward and away from said fixed fingers respectively to grasp the belt runs.

3. Drive interrupting mechanism comprising a power means having a drive wheel, a flexible belt to connect said drive wheel with a driven wheel, a movable carriage to movably support the power means and drive wheel, actuating means to move said carriage to release said belt from said drive wheel, and belt gripping means comprising a fixed support, fingers mounted upon said support and positioned adjacent the belt runs, other fingers slidably carried upon said support for coacting with said fixed fingers respectively, and rockable means on said support constructed and arranged to actuate said slidable fingers toward and away from said fixed fingers respectively to grasp the belt runs, said fixed and slidable fingers each including associated adjustable mechanism whereby to regulate the effective belt run grasping positions of said sets of fingers.

4. Drive interrupting mechanism comprising a power means having a drive wheel, a flexible belt to connect said drive wheel with a driven wheel, a movable carriage to movably support the power means and drive wheel, actuating means to move said carriage to release said belt from said drive wheel, and belt gripping means comprising simultaneously operable coacting fingers arranged to grasp both runs of said belt adjacent said drive wheel, a fixed support, certain of said fingers being carried in fixed positions upon said support and with respect to said belt runs, and certain other of said fingers being movably mounted upon said support for actuation toward and away from said fixed fingers to grasp the runs of the belt between said fingers respectively, and cooperative means connected with said fingers and with said movable carriage to cause operation of said fingers during operation of said carriage by said actuating means comprising a rockable member on said support having pivotal connection with the movable fingers, and a connecting rod on said carriage and pivotally joined with said rockable member.

5. Drive interrupting mechanism comprising a power means having a drive wheel, a flexible belt to connect said drive wheel with a driven wheel, a shiftable carriage to movably support the power means and drive wheel, actuating means to move said carriage to release said belt from said drive wheel, and belt gripping means comprising a fixed support flanking both runs of said belt, fingers mounted upon said support and positioned transversely with respect to the belt runs, other fingers movably carried upon said support for coacting with said fixed fingers respectively, and operative means constructed and arranged to actuate said movable fingers toward and away from said fixed fingers respectively to grasp the belt runs therebetween, said fingers each having hook ends comprising guides disposed adjacent the sides of the belt runs and at one side thereof, and said support comprising a guide arranged adjacent the other sides of said belt runs whereby said belt runs are at all times operably maintained in a given coplanar relation coincident with the planes of the drive and driven wheels.

6. In a drive interrupting mechanism comprising a drive element, a flexible driven member to connect said element with driven means, mechanism for bodily moving said drive element out of operative driving contact with said flexible driven member, and a grip mechanism to grasp and to hold said flexible driven member during drive release comprising a pair of coacting projecting fingers oppositely positioned with respect to said member and extending transversely across opposite portions of said driven member, a mounting structure including means to support the adjacent ends of said fingers for relative movement toward and away from said member, and actuating mechanism connected with said mounting structure and said fingers to move the fingers into and out of grasping contact with said flexible driven member, and cooperative guide means arranged to retain said flexible driven member in a given plane of operation between said grasping fingers comprising hook ends on the free terminal ends of said fingers and arranged at one side of said driven member with a portion of said mounting structure disposed at the other side of said driven member.

7. In a drive interrupting mechanism comprising a drive unit, a flexible power transmitting member to connect said drive unit with driven means, mechanism for bodily moving said drive unit into and out of operative driving engagement with said flexible power transmitting member, and a grip mechanism to grasp and to hold spaced parts of said flexible member in predetermined fixed positions upon separation of said drive unit from said flexible member during the drive release period comprising cooperative pairs of fixed and movable coacting fingers arranged adjacent opposite portions of the aforesaid spaced parts of said flexible member respectively, a mounting structure to support said fixed fingers, said mounting structure having slots therein to slidably carry said movable fingers in said slots, and rotatable actuating mechanism pivoted on said mounting structure and connected with said movable fingers to simultaneously move said coacting fingers toward said fixed fingers and into or out of operative grasping contact with said spaced parts of said flexible power transmitting member respectively.

8. In a drive interrupting mechanism comprising a drive unit, a flexible power transmitting member to connect said drive unit with driven means, mechanism for bodily moving said drive unit into and out of operative driving engagement with said flexible power transmitting member, and a grip mechanism to grasp and to hold spaced parts of said flexible member in predetermined fixed positions upon separation of said drive unit from said flexible member during the drive release period comprising cooperative pairs of fixed and movable coacting fingers arranged adjacent opposite portions of the aforesaid spaced parts of said flexible member respectively, a mounting structure to support said fixed fingers, said mounting structure having slots therein to slidably carry said movable fingers in said slots, and rotatable actuating mechanism pivoted on said mounting structure and connected with said movable fingers to simultaneously move said coacting fingers toward said fixed fingers and into or out of operative grasping contact with said spaced parts of said flexible power transmitting member respectively, and operative structure connected to respond to the bodily movements of said drive unit and connected with said rotatable actuating mechanism to cause said pairs of coacting fingers to grasp said parts of the flexible member during the drive release period.

References Cited in the file of this patent

UNITED STATES PATENTS

| | | |
|---|---|---|
| 1,394,100 | Leinbrock | Oct. 18, 1921 |
| 2,089,381 | Kassing | Aug. 10, 1937 |
| 2,133,593 | Tautz | Oct. 18, 1938 |
| 2,343,444 | Coon | Mar. 7, 1944 |
| 2,452,306 | Jones et al. | Oct. 26, 1948 |
| 2,458,255 | Couse | Jan. 4, 1949 |
| 2,459,373 | Gettys | Jan. 18, 1949 |
| 2,487,949 | Shekels | Nov. 15, 1949 |
| 2,528,917 | Slocum | Nov. 7, 1950 |
| 2,551,147 | Mayrath | May 1, 1951 |
| 2,557,612 | Neighbour et al. | June 19, 1951 |
| 2,670,631 | Anderson | Mar. 2, 1954 |